(12) United States Patent
Hosseini et al.

(10) Patent No.: US 12,016,015 B2
(45) Date of Patent: Jun. 18, 2024

(54) DETERMINATIONS OF MULTIPLEXING OR PRIORITIZATION OF CONFLICTING TRANSMISSIONS

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US); Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 17/447,531

(22) Filed: Sep. 13, 2021

(65) Prior Publication Data
US 2022/0086874 A1  Mar. 17, 2022

Related U.S. Application Data

(60) Provisional application No. 62/706,843, filed on Sep. 14, 2020.

(51) Int. Cl.
*H04W 72/1268* (2023.01)
*H04W 8/24* (2009.01)
*H04W 72/23* (2023.01)

(52) U.S. Cl.
CPC ......... *H04W 72/1268* (2013.01); *H04W 8/24* (2013.01); *H04W 72/23* (2023.01)

(58) Field of Classification Search
CPC ... H04W 72/1268; H04W 8/24; H04W 72/23; H04W 72/569; H04L 5/0092
See application file for complete search history.

(56) References Cited

U.S. PATENT DOCUMENTS

2017/0289995 A1* 10/2017 Lin .................. H04W 72/23
2020/0259625 A1*  8/2020 Papasakellariou ... H04B 7/0456

OTHER PUBLICATIONS

Ericsson, On intra-UE prioritization enablers, 3GPP TSG RAN WG1 Meeting #97, Reno, USA, May 13-May 17, 2019, R1-1906097 (Year: 2019).*
NTT Docomo, Inc., UL intra-UE transmission prioritization/multiplexing and physical layer enhancements for DL SPS, 3GPP TSG RAN WG1 #96bis, Athens, Greece, Feb. 25-Mar. 1, 2019, R1-1904694 (Year: 2019).*
Vivo, Further discussion on Multi-TRP/Panel transmission, 3GPP TSG RAN WG1 Meeting #97, Reno, USA, May 13-May 17, 2019, R1-1906159 (Year: 2019).*

(Continued)

*Primary Examiner* — Shailendra Kumar
(74) *Attorney, Agent, or Firm* — Harrity & Harrity, LLP

(57) ABSTRACT

Various aspects of the present disclosure generally relate to wireless communication. In some aspects, a mobile station may determine whether to multiplex or prioritize a first communication and a second communication that are scheduled for simultaneous transmissions via a first channel and a second channel, respectively. The mobile station may transmit one or more of the first communication or the second communication based at least in part on the determination of whether to multiplex or prioritize the first communication and the second communication. Numerous other aspects are provided.

30 Claims, 8 Drawing Sheets

(56) References Cited

OTHER PUBLICATIONS

Ericsson, UCI Enhancements for NR URLLC, 3GPP TSG RAN WG1 Meeting #97, Reno, USA, May 13-May 17, 2019, R1-1906092. (Year: 2019).*
Ericsson: "On Intra-UE Prioritization Enablers," 3GPP Draft, 3GPP TSG RAN WG1 Meeting #97, R1-1906097, On Intra-UE Prioritization Enablers, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 4, 2019 (May 4, 2019), XP051708139, 11 Pages, Retrieved from the Internet: URL: http://www.3gpp.org/ftp/tsg%5Fran/WG1%5FRL1/TSGR1%5F97/Docs/R1%2D1906097%2Ezip [retrieved on May 4, 2019] Section 2.2, p. 3-p. 4.
International Search Report and Written Opinion—PCT/US2021/071449—ISA/EPO—Dec. 21, 2021.
NTT Docomo, et al., "UL Intra-UE Transmission Prioritization/Multiplexing and Physical Layer Enhancements for DL SPS", 3GPP Draft, 3GPP TSG RAN WG1 #96bis, R1-1904964, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019 Apr. 3, 2019 (Apr. 3, 2019), XP051707358, pp. 1-8, Retrieved from the Internet: URL: http://www.3gpp.org/ftp/tsg%5Fran/WG1%5FRL1/TSGR1%5F96b/Docs/R1%2D1904964%2Ezip [retrieved on Apr. 3, 2019] the whole document.
VIVO: "Further Discussion on Multi-TRP/Panel Transmission", 3GPP Draft, 3GPP TSG RAN WG1 #97, R1-1906159_Further Discussion on Multi-TRP/Panel Transmission_Final, 3rd Generation Partnership Project (3GPP), Mobile Competence Centre, 650, Route Des Lucioles, F-06921 Sophia-Antipolis Cedex, France, vol. RAN WG1, No. Reno. USA, May 13, 2019-May 17, 2019, May 4, 2019 (May 4, 2019), XP051708200, 18 pages, Retrieved from the Internet: URL: http://www.3gpp.org/ftp/tsg%5Fran/WG1%5FRL1/TSGR1%5F97/Docs/R1%2D1906159%2Ezip, [retrieved on May 4, 2019], chapters 2. 3.1. 4.1.3. 5-7, Section 2.1. 3.1, pp. 12-15, 5. PUCCH for Multi-TRP.

* cited by examiner

DETERMINATIONS OF MULTIPLEXING OR PRIORITIZATION OF CONFLICTING TRANSMISSIONS

CROSS-REFERENCE TO RELATED APPLICATION

This Patent Applications claims priority to U.S. Provisional Patent Application No. 62/706,843, filed on Sep. 14, 2020, entitled "DETERMINATIONS OF MULTIPLEXING OR PRIORITIZATION OF CONFLICTING TRANSMISSIONS," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for determinations of multiplexing or prioritization of conflicting transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a mobile station includes determining, by the mobile station, whether to multiplex or prioritize a first communication and a second communication that are scheduled for simultaneous transmissions via a first channel and a second channel, respectively; and transmitting, by the mobile station, one or more of the first communication or the second communication based at least in part on the determination of whether to multiplex or prioritize the first communication and the second communication.

In some aspects, a method of wireless communication performed by a base station includes transmitting, by the base station and to a mobile station, a first scheduling grant associated with a first communication via a first channel and a second scheduling grant associated with a second communication via a second channel, the first communication and the second communication scheduled for simultaneous transmission; and receiving, by the base station and from the mobile station, one or more of the first communication or the second communication based at least in part on a determination, by the mobile station, of whether to multiplex or prioritize the first communication and the second communication.

In some aspects, a mobile station for wireless communication includes a memory and one or more processors coupled to the memory, the one or more processors configured to: determine whether to multiplex or prioritize a first communication and a second communication that are scheduled for simultaneous transmissions via a first channel and a second channel, respectively; and transmit one or more of the first communication or the second communication based at least in part on the determination of whether to multiplex or prioritize the first communication and the second communication.

In some aspects, a base station for wireless communication includes a memory and one or more processors coupled to the memory, the one or more processors configured to: transmit, to a mobile station, a first scheduling grant associated with a first communication via a first channel and a second scheduling grant associated with a second communication via a second channel, the first communication and the second communication scheduled for simultaneous transmission; and receive by the base station and from the mobile station, one or more of the first communication or the second communication based at least in part on a determination of whether to multiplex or prioritize the first communication and the second communication.

In some aspects, a non-transitory computer-readable medium storing a set of instructions for wireless communication includes one or more instructions that, when executed by one or more processors of a mobile station, cause the mobile station to: determine whether to multiplex or prioritize a first communication and a second communication that are scheduled for simultaneous transmissions via a first channel and a second channel, respectively; and transmit one or more of the first communication or the second communication based at least in part on the determination of whether to multiplex or prioritize the first communication and the second communication.

In some aspects, a non-transitory computer-readable medium storing a set of instructions for wireless communication includes one or more instructions that, when executed by one or more processors of a base station, cause the base station to: transmit, to a mobile station, a first scheduling grant associated with a first communication via a first channel and a second scheduling grant associated with a second communication via a second channel, the first communication and the second communication scheduled for simultaneous transmission; and receive by the base station and from the mobile station, one or more of the first communication or the second communication based at least in part on a determination of whether to multiplex or prioritize the first communication and the second communication.

In some aspects, an apparatus for wireless communication includes means for determining whether to multiplex or prioritize a first communication and a second communication that are scheduled for simultaneous transmissions via a first channel and a second channel, respectively; and means for transmitting one or more of the first communication or the second communication based at least in part on the determination of whether to multiplex or prioritize the first communication and the second communication.

In some aspects, an apparatus for wireless communication includes means for transmitting, to a mobile station, a first scheduling grant associated with a first communication via a first channel and a second scheduling grant associated with a second communication via a second channel, the first communication and the second communication scheduled for simultaneous transmission; and means for receiving by the apparatus and from the mobile station, one or more of the first communication or the second communication based at least in part on a determination of whether to multiplex or prioritize the first communication and the second communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
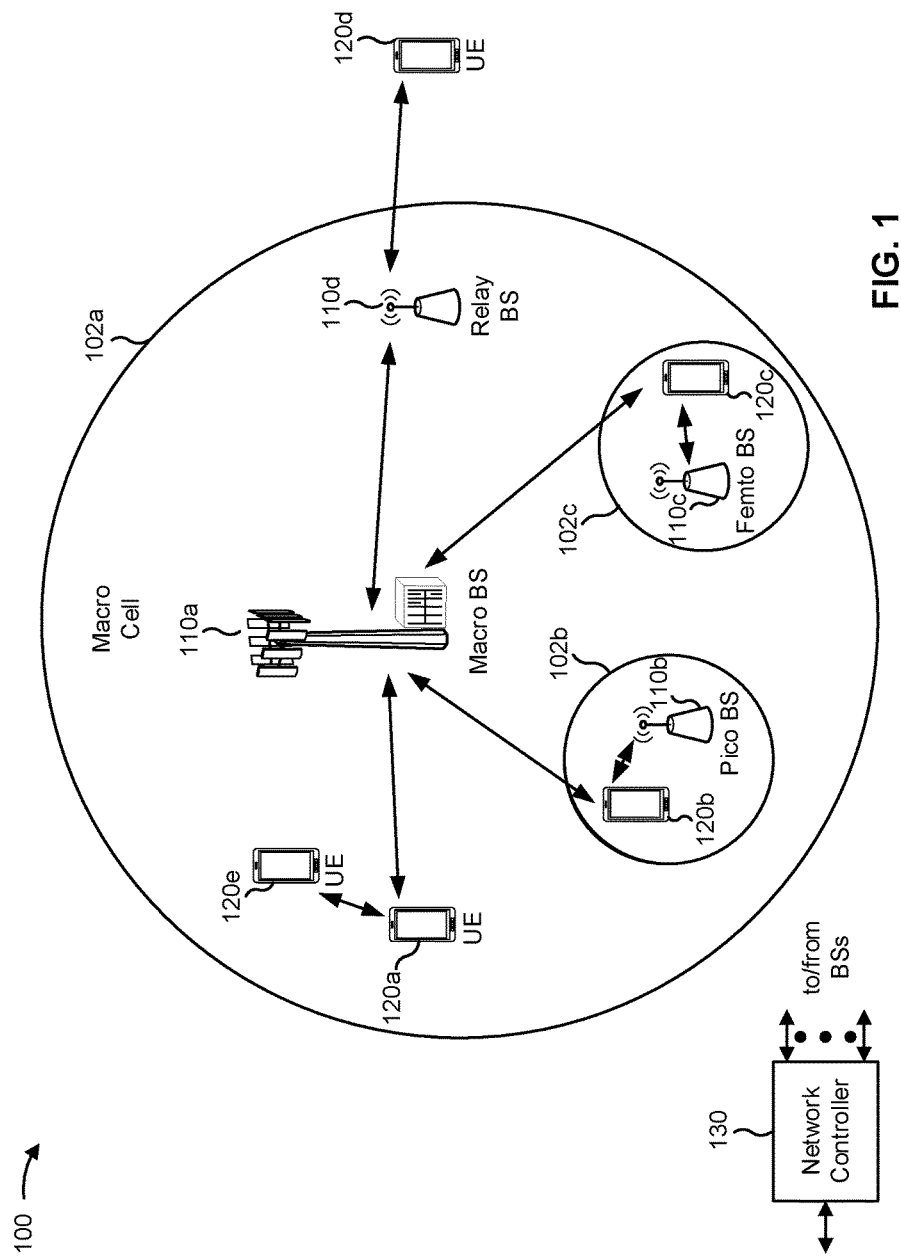
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
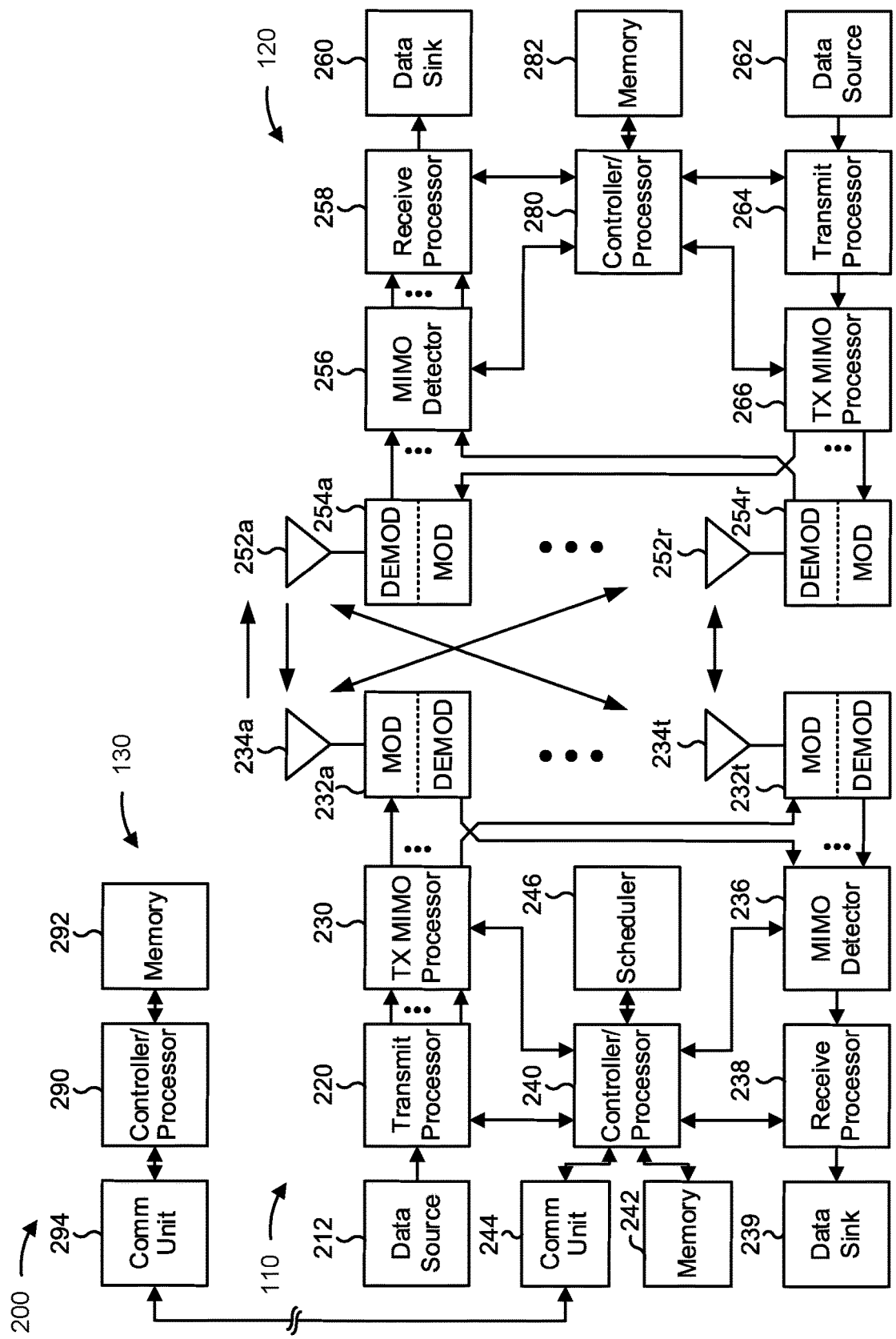
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-8).

Controller/processor 240 of base station 110, controller/processor 280 of UE 120, and/or any other component(s) of FIG. 2 may perform one or more techniques associated with determinations of multiplexing or prioritization of conflicting transmissions, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the mobile station includes means for determining, by the mobile station, whether to multiplex or prioritize a first communication and a second communication that are scheduled for simultaneous transmissions via a first channel and a second channel, respectively; and/or means for transmitting, by the mobile station, one or more of the first communication or the second communication based at least in part on the determination of whether to multiplex or prioritize the first communication and the second communication. The means for the mobile station to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the mobile station includes means for transmitting the first communication and the second communication on two or more of the first channel, the second channel, or a third channel simultaneously; or means for transmitting the first communication and the second communication on one of the first channel, the second channel, or the third channel.

In some aspects, the mobile station includes means for transmitting an indication of a capability of the mobile station to support simultaneous transmission via multiple channels.

In some aspects, the mobile station includes means for receiving an indication of whether to multiplex or prioritize the first communication and the second communication, wherein the determination of whether to multiplex or prioritize the first communication and the second communication is based at least in part on the indication.

In some aspects, the mobile station includes means for receiving the indication via one or more scheduling grants associated with one or more of the first communication or the second communication or receiving the indication via a radio resource control communication.

In some aspects, the base station includes means for transmitting, by the base station and to a mobile station, a first scheduling grant associated with a first communication via a first channel and a second scheduling grant associated with a second communication via a second channel, the first communication and the second communication scheduled for simultaneous transmission; and/or means for receiving, by the base station and from the mobile station, one or more of the first communication or the second communication based at least in part on a determination, by the mobile station, of whether to multiplex or prioritize the first communication and the second communication. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station includes means for receiving the first communication and the second communication, via multiplexing, on two or more of the first channel, the second channel, or a third channel simultaneously; or means for receiving the first communication and the second communication, via multiplexing, on one of the first channel, the second channel, or the third channel.

In some aspects, the base station includes means for receiving an indication of a capability of the mobile station to support simultaneous transmission via multiple channels.

In some aspects, the base station includes means for transmitting an indication of whether to multiplex or prioritize the first communication and the second communication, wherein the determination of whether to multiplex or prioritize the first communication and the second communication is based at least in part on the indication.

In some aspects, the base station includes means for transmitting the indication via one or more of the first scheduling grant or the second scheduling grant.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
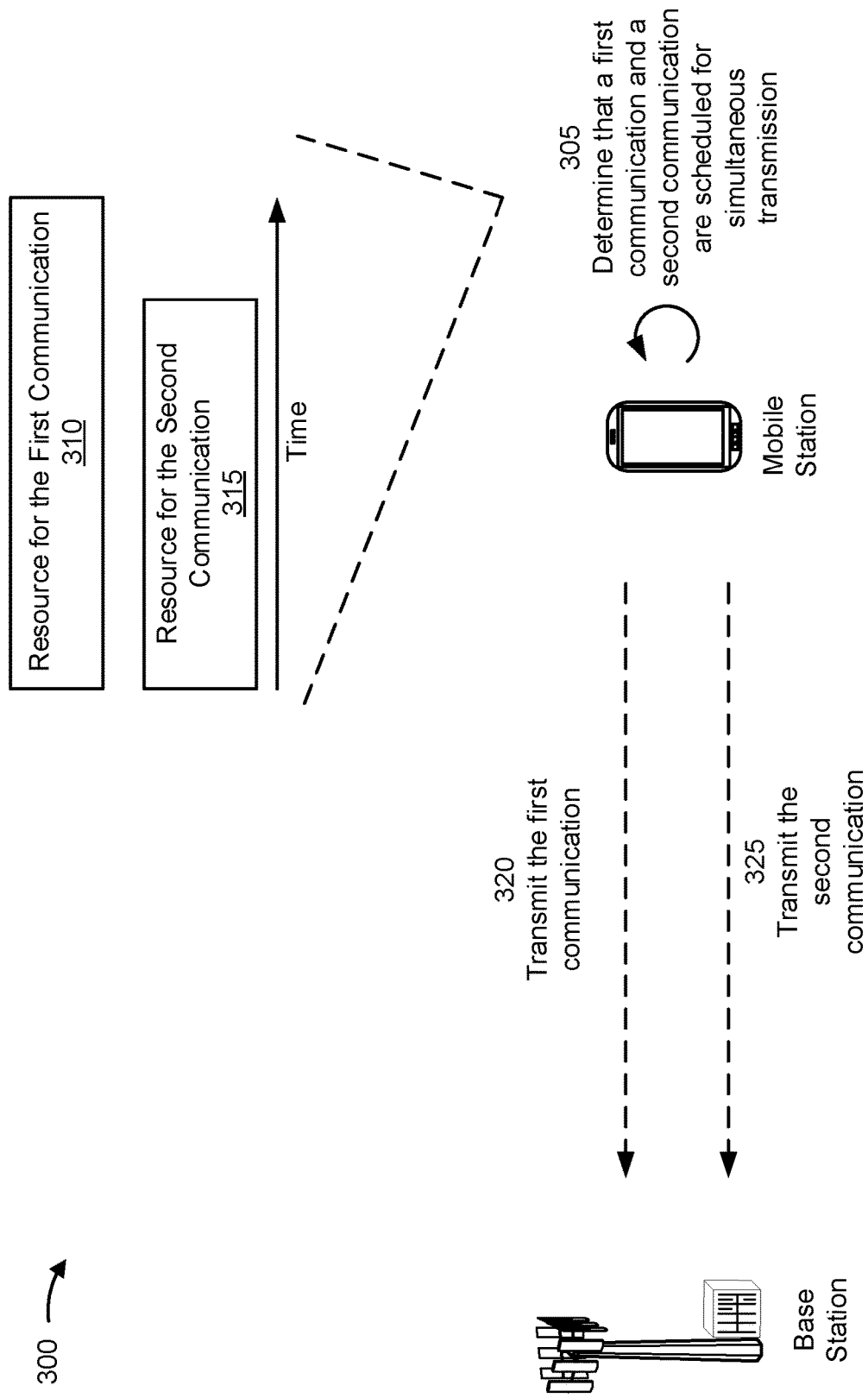
FIG. 3 is a diagram illustrating an example of handling of conflicting transmissions, in accordance with the present disclosure.

FIG. 3 is a diagram illustrating an example 300 of handling of conflicting transmissions, in accordance with the present disclosure. As shown in FIG. 3, a mobile station (e.g., a UE) may communicate with a base station. The mobile station and the base station may be part of a wireless network. The base station may schedule multiple simultaneous transmissions by the mobile station.

As shown by reference number 305, the mobile station may determine that a first communication and a second communication are scheduled for simultaneous transmission. For example, a portion of a resource for the first communication 310 may partially or fully overlap (e.g., collide or conflict, among other examples) in time with a portion of a resource for the second communication 315. In other words, the first communication and the second communication may be scheduled for simultaneous transmission when a resource associated with the first communication and a resource associated with the second transmission overlap fully or partially in time.

The base station may transmit one or more scheduling grants (e.g., a resource grant or an uplink grant, among other examples) associated with the first communication and the second communication. The one or more scheduling grants may schedule the first communication for transmission via a first channel and schedule the second communication for transmission via a second channel.

As shown by reference number 320, the mobile station may transmit the first communication. As shown by reference number 325, the mobile station may transmit the second communication.

When channels of different priorities collide, the mobile station may prioritize the first communication and the second communication to determine which communication to transmit and which communication to cancel. The mobile station may perform the determination based at least in part on indicated priorities of the first channel and the second channel. For example, the first channel and the second channel may be assigned a priority (e.g., 0 for low priority or 1 for high priority).

In some wireless networks, the mobile station may support multiplexing multiple communications on multiple channels. For example, if two channels have a same priority, the mobile station may multiplex (e.g., using simultaneous transmission via frequency division multiplexing and/or multiplexing into a single channel, among other examples) the first communication and the second communication. In other examples, the mobile station may multiplex the first communication and the second communication when the two channels have different priorities.

The mobile station may support multiplexing conflicting transmissions into a single channel, may support simultaneous transmission (e.g., multiplexing) of the conflicting transmissions on different channels, and/or may support prioritization, among other examples. However, the mobile station may not know which supported action it should take. This may result in the mobile station multiplexing a high priority communication with a low priority communication, which may cause the base station to fail to receive the high priority communication. This may cause increased latency and/or consume processing, communication, network, and/or power resources to detect and correct the failure to receive the high priority communication.

As indicated above, FIG. 3 is provided as an example. Other examples may differ from what is described with regard to FIG. 3.

In some aspects described herein, a mobile station may receive, from a base station, one or more scheduling grants associated with a first communication on a first channel and a second communication on a second channel. The mobile station may determine whether to multiplex or prioritize the first communication and the second communication. In some aspects, the mobile station may determine whether to multiplex or prioritize based at least in part on an indication from the base station (e.g., an explicit indication, an indication in downlink control information (DCI), and/or in a scheduling grant, among other examples).

In some aspects, the mobile station may determine whether to multiplex or prioritize based at least in part on one or more parameters associated with the first communication, the second communication, the first channel, and/or the second channel, among other examples. In some aspects, the mobile station may apply one or more rules (e.g., configured rules) based at least in part on the one or more parameters.

Based at least in part on the mobile station determining whether to multiplex or prioritize the first communication and the second communication based at least in part on an indication from the base station and/or based at least in part on one or more parameters associated with the first communication, the second communication, the first channel, and/or the second channel, the mobile station may multiplex or prioritize the first communication and the second communication in a way that reduces a likelihood of the base station failing to receive a high priority communication. This may cause reduced latency and/or conserve processing, communication, network, and/or power resources that may otherwise have been used to detect and correct a failure to receive the high priority communication.

Figure 4:
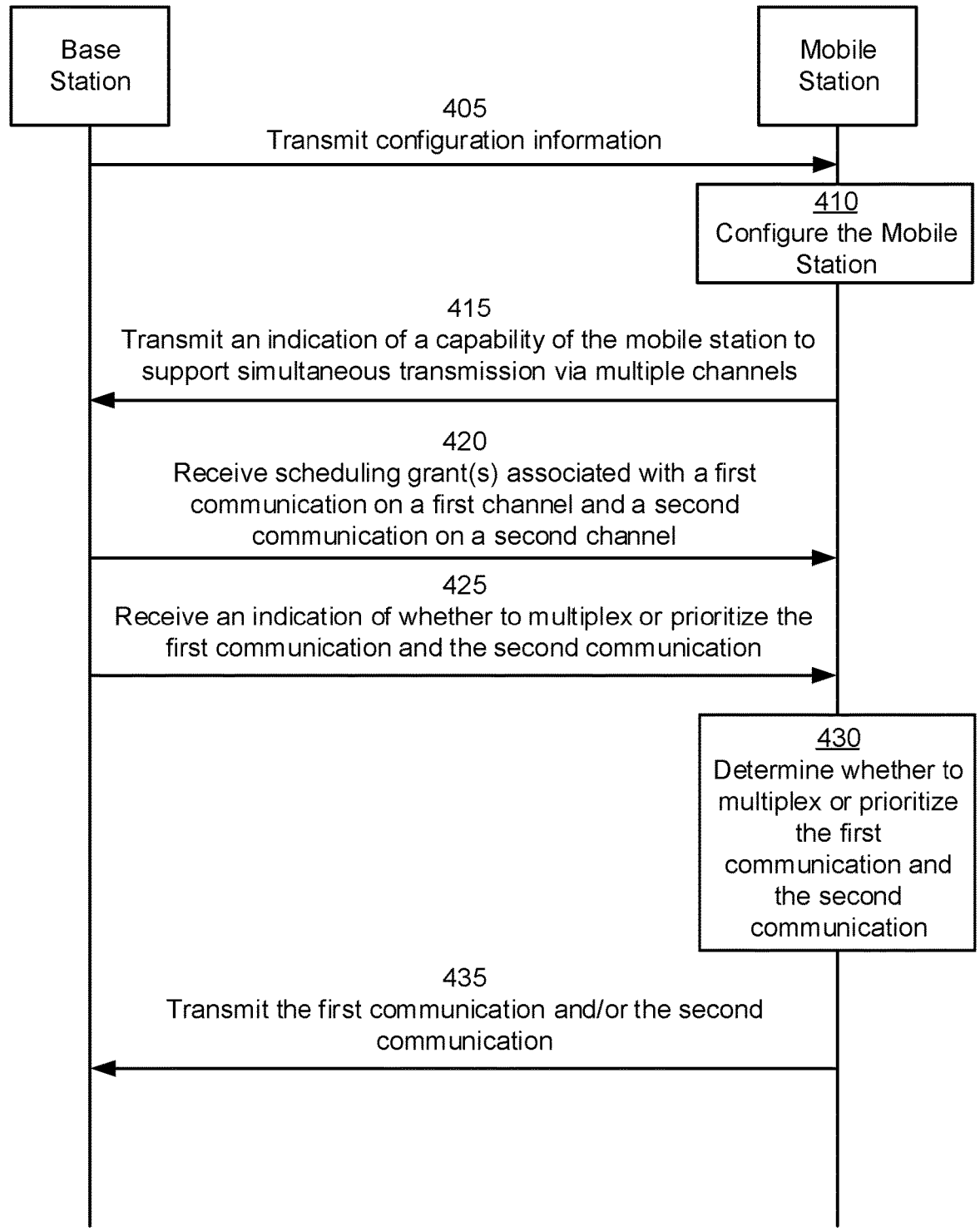
FIG. 4 is a diagram illustrating an example associated with determinations of multiplexing or prioritization of conflicting transmissions, in accordance with the present disclosure.

FIG. 4 is a diagram illustrating an example 400 associated with determinations of multiplexing or prioritization of conflicting transmissions, in accordance with the present disclosure. As shown in FIG. 4, a mobile station (e.g., UE 120) may communicate with a base station (e.g., base station 110). The mobile station and the base station may be part of a wireless network (e.g., wireless network 100).

As shown by reference number 405, the base station may transmit, and the mobile station may receive, configuration information. In some aspects, the mobile station may receive configuration information from another device (e.g., from another base station and/or another mobile station) and/or a communication standard, among other examples. In some aspects, the mobile station may receive the configuration information via one or more of radio resource control (RRC) signaling, medium access control (MAC) signaling (e.g., MAC control elements (MAC CEs)), and/or the like. In some aspects, the configuration information may include an indication of one or more configuration parameters (e.g., already known to the mobile station) for selection by the mobile station, explicit configuration information for the mobile station to use to configure the mobile station, and/or the like.

In some aspects, the configuration information may indicate that the mobile station is to provide an indication of a capability of the mobile station to support multiplexing of colliding transmissions (e.g., of communications scheduled for simultaneous transmission via different channels). In some aspects, the configuration information may indicate that the base station may transmit an indication of whether to multiplex or prioritize communications based at least in part on channels associated with the communications. In some aspects, the configuration information may indicate that the mobile station is to determine whether to multiplex or prioritize the communications based at least in part on the indication from the base station.

In some aspects, the configuration information may indicate that the mobile station is to determine whether to multiplex or prioritize the communications based at least in part on one or more parameters associated with the communications and/or the channels associated with the communications. In some aspects, the configuration information may provide rules for application based at least in part on the one or more parameters.

As shown by reference number 410, the mobile station may configure the mobile station for communicating with the base station. In some aspects, the mobile station may configure the mobile station based at least in part on the configuration information. In some aspects, the mobile station may be configured to perform one or more operations described herein.

As shown by reference number 415, the mobile station may transmit, and the base station may receive, an indication of a capability of the mobile station to support simultaneous transmission via multiple channels. In some aspects, the mobile station may transmit the indication via RRC signaling, one or more MAC CEs, and/or a physical uplink control channel (PUCCH) message, among other examples. In some aspects, the mobile station may support simultaneous transmission via multiple channels based at least in part on one or more components of the mobile station.

As shown by reference number 420, the mobile station may receive, and the base station may transmit, one or more scheduling grants associated with a first communication on a first channel and a second communication on a second channel. In some aspects, the mobile station may receive the one or more scheduling grants via multiple messages. In some aspects, the mobile station may receive a first scheduling grant associated with the first communication at a first time and may receive a second scheduling grant associated with the second communication at a second time.

In some aspects, the first channel may be associated with a first priority. For example, the first priority may be based at least in part on an explicit indication or based at least in part on one or more parameters associated with the first channel (e.g., a channel type or a location of resources allocated for the channel, among other examples). In some aspects, the second channel may be associated with a second priority. In some aspects, the first priority may be higher than the second priority, the second priority may be higher than the first priority, or the first priority may be the same as the second priority.

In some aspects, the first communication may be associated with a first priority. For example, the first priority may be based at least in part on an explicit indication or based at least in part on one or more parameters associated with the first scheduling grant (e.g., a type of communication or a size of the communication, among other examples). In some aspects, the second communication may be associated with a second priority. In some aspects, the first priority may be higher than the second priority, the second priority may be higher than the first priority, or the first priority may be the same as the second priority.

As shown by reference number 425, the mobile station may receive, and the base station may transmit, an indication of whether to multiplex or prioritize the first communication and the second communication. In some aspects, the mobile station may receive the indication (e.g., an explicit indication) within the one or more scheduling grants. For example, the indication may include a number of bits (e.g., 1 bit) within a DCI that schedules the first communication and/or the second communication.

In some aspects, the indication may be included in an RRC communication (e.g., as a semi-static configuration). In some aspects, the RRC communication may indicate one or more parameters to be used to determine a prioritization of the first communication and the second communication. For example, the RRC communication may indicate that communications using a first carrier, a first channel, and/or a first bandwidth part is to be prioritized over communications using a second carrier, a second channel, and/or a first bandwidth part. The RRC communication may be received before receiving the one or more scheduling grants (described in connection with reference number 420).

In some aspects, the indication may include an indication of whether the first communication and the second communication can be multiplexed on the first channel. In some aspects, the indication may include an indication of whether the first communication and the second communication can be multiplexed on the second channel and/or an indication of whether the first communication and the second communication can be multiplexed on a third channel (e.g., a channel that is different from the first channel and the second channel). In other words, the indication may indicate whether content of one of the communications may be multiplexed (e.g., piggybacked) onto a transmission of the other communication.

As shown by reference number 430, the mobile station may determine whether to multiplex or prioritize the first communication and the second communication. In some aspects, the mobile station may determine whether to multiplex or prioritize the first communication and the second communication based at least in part on the indication described with reference to reference number 425. In some aspects, the mobile station may determine whether to multiplex or prioritize the first communication and the second communication independently from, or in absence of, an indication from the base station.

In some aspects, the mobile station may determine whether to multiplex or prioritize the first communication and the second communication based at least in part on one or more parameters associated with one or more of the first communication, the second communication, the first channel, or the second channel.

The one or more parameters may include one or more parameters associated with the first communication and/or the second communication. In some aspects, the one or more parameters associated with the first communication and/or the second communication may include locations of resources of the first channel or the second channel, a number of bits of the first communication, a number of bits of the second communication, an MCS of the first communication, an MCS of the second communication, and/or a content type of one or more of the first communication or the second communication, among other examples.

The one or more parameters may include one or more parameters associated with the first channel and/or the second channel. In some aspects, the one or more parameters associated with the first channel and/or the second channel may include whether the first channel collides with a beginning of the second channel, whether the second channel collides with a beginning of the first channel, among other examples. In some aspects, the one or more parameters associated with the first channel and/or the second channel may include a configuration of a hybrid automatic repeat request (HARM) feedback codebook of one or more of the first channel or the second channel, a DMRS pattern configured for one or more of the first channel or the second channel, or whether the first channel and/or the second channel is scheduled with repetitions, among other examples. In some aspects, the one or more parameters associated with the first channel and/or the second channel may include whether the first channel and the second channel are associated with a single TRP and/or multiple TRPs, or a channel type (e.g., a shared channel or a control channel, among other examples) of one or more of the first channel or the second channel, among other examples.

The one or more parameters may include one or more parameters associated with the first scheduling grant and/or the second scheduling grant. In some aspects, the one or more parameters associated with the first scheduling grant and/or the second scheduling grant may include an order of receipt of the first scheduling grant and receipt of the second scheduling grant.

The one or more parameters may include one or more parameters associated with the mobile station. In some aspects, the one or more parameters associated with the mobile station may include whether the mobile station supports maintaining phase continuity across simultaneous transmissions of the first communication and the second communication, whether the mobile station is power limited for simultaneous transmission, whether a maximum power reduction associated with simultaneous transmission satisfies a threshold, whether the mobile station supports simultaneous transmission of multiple communications, or whether the first channel and the second channel are scheduled (e.g., via dynamic scheduling of dynamic communications) or configured (e.g., via RRC signaling) on inter-band component carriers or intra-band component carriers, among other examples.

As shown by reference number 435, the mobile station may transmit, and the base station may receive, the first communication and/or the second communication. For example, the mobile station may transmit the first communication and/or the second communication based at least in part on the determination of whether to multiplex or prioritize the first communication and the second communication.

In some aspects, multiplexing the first communication and the second communication may include transmitting the first communication and the second communication (e.g., separately) on two or more of the first channel, the second channel, or a third channel simultaneously. For example, the mobile station may transmit the first communication on the first channel simultaneously (e.g., partially or fully overlapping in time) with transmitting the second communication on the second channel.

In some aspects, multiplexing the first communication and the second communication may include transmitting the first communication and the second communication (e.g., together) on one of the first channel, the second channel, or the third channel. For example, the first communication may be multiplexed with the second communication on the second channel, or the second communication may be multiplexed with the first communication on the first channel.

Based at least in part on the mobile station determining whether to multiplex or prioritize the first communication and the second communication based at least in part on an indication from the base station and/or based at least in part on one or more parameters associated with the first communication, the second communication, the first channel, and/or the second channel, the mobile station may multiplex or prioritize the first communication and the second communication in a way that reduces a likelihood of the base station failing to receive a high priority communication. Additionally, or alternatively, the mobile station may multiplex a low priority communication with the high priority communication based at least in part on parameters that indicate that multiplexing is unlikely to cause the base station to fail to receive the high priority communication. This may cause reduced latency and/or conserve processing, communication, network, and/or power resources that may otherwise have been used to detect and correct a failure to receive the high priority communication.

As indicated above, FIG. 4 is provided as an example. Other examples may differ from what is described with regard to FIG. 4.

Figure 5:
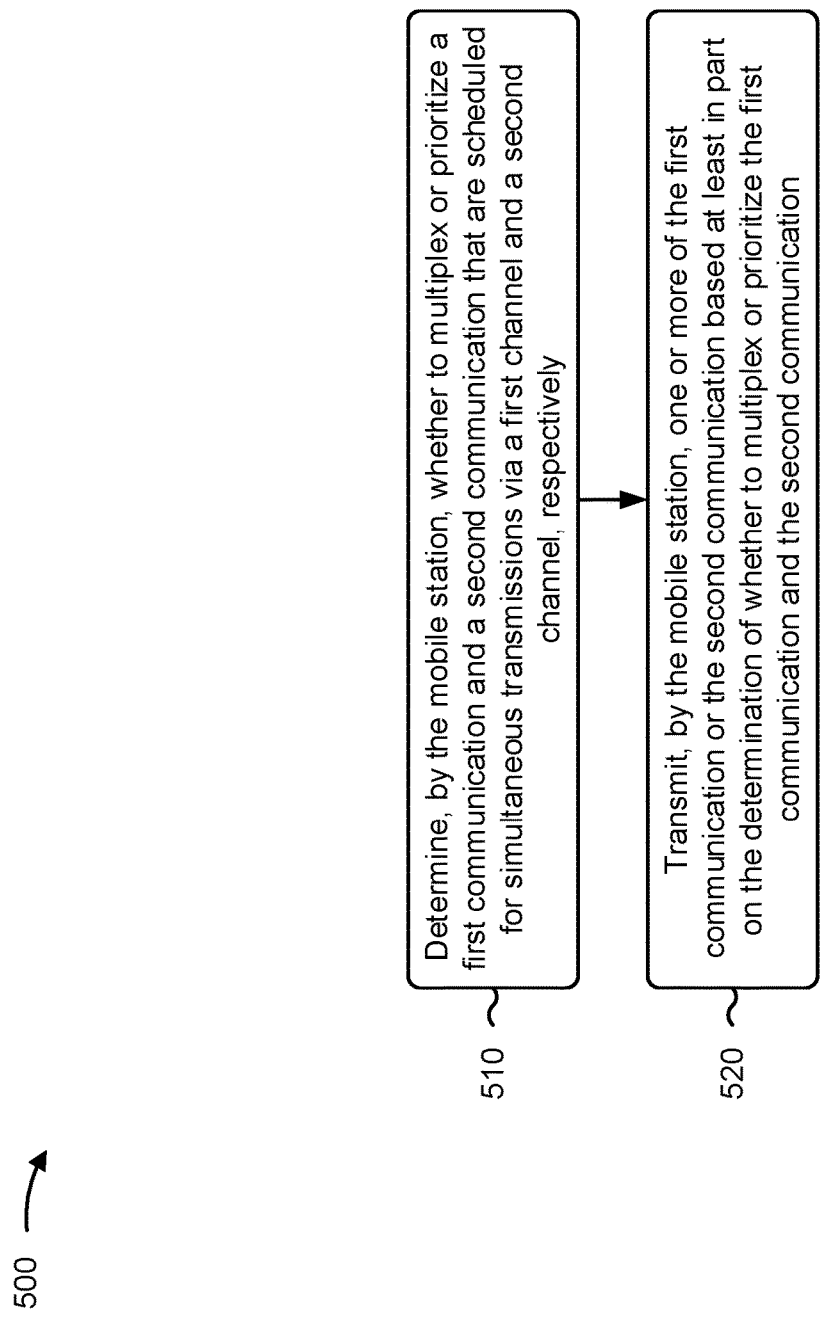
FIGS. 5 and 6 are diagrams illustrating example processes associated with determinations of multiplexing or prioritization of conflicting transmissions, in accordance with the present disclosure.

FIG. 5 is a diagram illustrating an example process 500 performed, for example, by a mobile station, in accordance with the present disclosure. Example process 500 is an example where the mobile station (e.g., mobile station 120) performs operations associated with determinations of multiplexing or prioritization of conflicting transmissions.

As shown in FIG. 5, in some aspects, process 500 may include determining whether to multiplex or prioritize a first communication and a second communication that are scheduled for simultaneous transmissions via a first channel and a second channel, respectively (block 510). For example, the mobile station (e.g., using determination component 708, depicted in FIG. 7) may determine whether to multiplex or prioritize a first communication and a second communication that are scheduled for simultaneous transmissions via a first channel and a second channel, respectively, as described above.

As further shown in FIG. 5, in some aspects, process 500 may include transmitting one or more of the first communication or the second communication based at least in part on the determination of whether to multiplex or prioritize the first communication and the second communication (block 520). For example, the mobile station (e.g., using transmission component 704, depicted in FIG. 7) may transmit one or more of the first communication or the second communication based at least in part on the determination of whether to multiplex or prioritize the first communication and the second communication, as described above.

Process 500 may include additional aspects, such as any single aspect or any combination of aspects described below and/or in connection with one or more other processes described elsewhere herein.

In a first aspect, multiplexing the first communication and the second communication includes one or more of transmitting the first communication and the second communication on two or more of the first channel, the second channel, or a third channel simultaneously, or transmitting the first communication and the second communication on one of the first channel, the second channel, or the third channel.

In a second aspect, alone or in combination with the first aspect, process 500 includes transmitting an indication of a capability of the mobile station to support simultaneous transmission via multiple channels.

In a third aspect, alone or in combination with one or more of the first and second aspects, process 500 includes receiving an indication of whether to multiplex or prioritize the first communication and the second communication, wherein the determination of whether to multiplex or prioritize the first communication and the second communication is based at least in part on the indication.

In a fourth aspect, alone or in combination with one or more of the first through third aspects, the indication of whether to multiplex or prioritize the first communication and the second communication includes an indication of whether the first communication and the second communication can be multiplexed on the first channel, an indication of whether the first communication and the second communication can be multiplexed on the second channel, or an indication of whether the first communication and the second communication can be multiplexed on a third channel.

In a fifth aspect, alone or in combination with one or more of the first through fourth aspects, receiving the indication includes receiving the indication via one or more scheduling grants associated with one or more of the first communication or the second communication, or receiving the indication via a radio resource control communication.

In a sixth aspect, alone or in combination with one or more of the first through fifth aspects, the determination of whether to multiplex or prioritize the first communication and the second communication is based at least in part on one or more parameters associated with one or more of the first communication, the second communication, the first channel, or the second channel.

In a seventh aspect, alone or in combination with one or more of the first through sixth aspects, the one or more parameters include one or more of: locations of resources of the first channel or the second channel, a number of bits of the first communication, a number of bits of the second communication, an MCS of the first communication, an MCS of the second communication, or a content type of one or more of the first communication or the second communication.

In an eighth aspect, alone or in combination with one or more of the first through seventh aspects, the one or more parameters include one or more of: whether the first channel collides with a beginning of the second channel, whether the second channel collides with a beginning of the first channel, a configuration of a HARQ feedback codebook of one or more of the first channel or the second channel, a demodulation reference signal pattern configured for one or more of the first channel or the second channel, whether the first channel is scheduled with repetitions, whether the second channel is scheduled with repetitions, whether the first channel and the second channel are associated with a single TRP or multiple TRPs, or a channel type of one or more of the first channel or the second channel.

In a ninth aspect, alone or in combination with one or more of the first through eighth aspects, the one or more parameters include one or more of: whether receipt of a first scheduling grant associated with the first communication occurs before receipt of a second scheduling grant associated with the second communication, whether receipt of a first scheduling grant associated with a higher priority communication of the first communication and the second communication occurs before receipt of a second scheduling grant associated with a lower priority communication of the first communication and the second communication, or whether receipt of a first scheduling grant associated with a shared channel communication of the first communication and the second communication occurs before receipt of a second scheduling grant associated with a control channel communication of the first communication and the second communication.

In a tenth aspect, alone or in combination with one or more of the first through ninth aspects, the one or more parameters include one or more of: whether the mobile station supports maintaining phase continuity across simultaneous transmissions of the first communication and the second communication, whether the mobile station is power limited for simultaneous transmission, whether a maximum power reduction associated with simultaneous transmission satisfies a threshold, whether the mobile station supports simultaneous transmission of multiple communications, or whether the first channel and the second channel are scheduled or configured on inter-band component carriers or intra-band component carriers.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
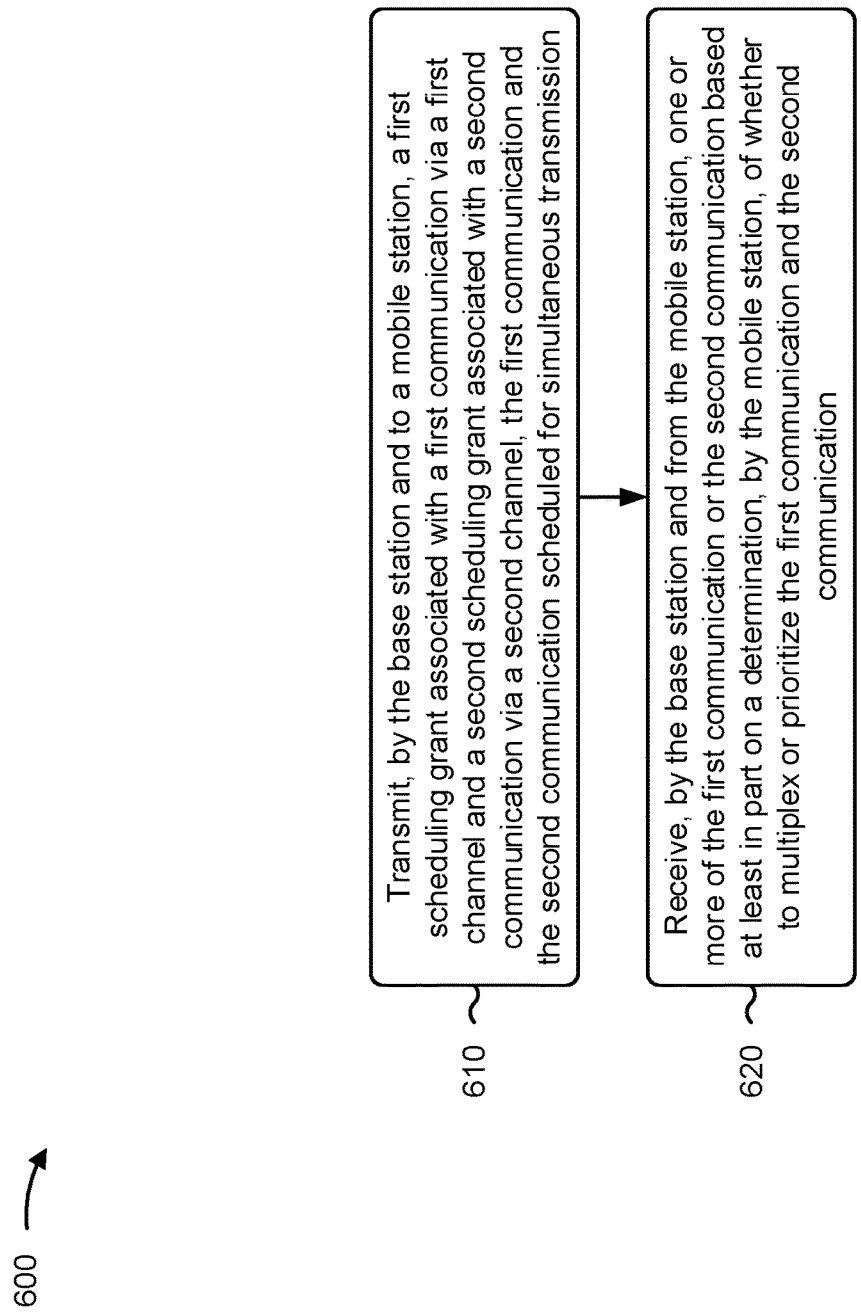

FIG. 6 is a diagram illustrating an example process 600 performed, for example, by a base station, in accordance with the present disclosure. Example process 600 is an example where the base station (e.g., base station 110) performs operations associated with determinations of multiplexing or prioritization of conflicting transmissions.

As shown in FIG. 6, in some aspects, process 600 may include transmitting, to a mobile station, a first scheduling grant associated with a first communication via a first channel and a second scheduling grant associated with a second communication via a second channel, the first communication and the second communication scheduled for simultaneous transmission (block 610). For example, the base station (e.g., using transmission component 804, depicted in FIG. 8) may transmit, to a mobile station, a first scheduling grant associated with a first communication via a first channel and a second scheduling grant associated with a second communication via a second channel, the first communication and the second communication scheduled for simultaneous transmission, as described above.

As further shown in FIG. 6, in some aspects, process 600 may include receiving, from the mobile station, one or more of the first communication or the second communication based at least in part on a determination of whether to multiplex or prioritize the first communication and the second communication (block 620). For example, the base station (e.g., using reception component 802, depicted in FIG. 8) may receive, from the mobile station, one or more of the first communication or the second communication based at least in part on a determination of whether to multiplex or prioritize the first communication and the second communication, as described above.

Process 600 may include additional aspects, such as any single aspect or any combination of aspects described below and/or in connection with one or more other processes described elsewhere herein.

In a first aspect, receiving the first communication and the second communication includes one or more of receiving the first communication and the second communication, via multiplexing, on two or more of the first channel, the second channel, or a third channel simultaneously, or receiving the first communication and the second communication, via multiplexing, on one of the first channel, the second channel, or the third channel.

In a second aspect, alone or in combination with the first aspect, process 600 includes receiving an indication of a capability of the mobile station to support simultaneous transmission via multiple channels.

In a third aspect, alone or in combination with one or more of the first and second aspects, process 600 includes transmitting an indication of whether to multiplex or prioritize the first communication and the second communication, wherein the determination of whether to multiplex or prioritize the first communication and the second communication is based at least in part on the indication.

In a fourth aspect, alone or in combination with one or more of the first through third aspects, the indication of whether to multiplex or prioritize the first communication and the second communication includes an indication of whether the first communication and the second communication can be multiplexed on the first channel, an indication of whether the first communication and the second communication can be multiplexed on the second channel, or an indication of whether the first communication and the second communication can be multiplexed on a third channel.

In a fifth aspect, alone or in combination with one or more of the first through fourth aspects, transmitting the indication includes transmitting the indication via one or more of the first scheduling grant or the second scheduling grant.

In a sixth aspect, alone or in combination with one or more of the first through fifth aspects, the determination of whether to multiplex or prioritize the first communication and the second communication is based at least in part on one or more parameters associated with one or more of the first communication, the second communication, the first channel, or the second channel.

In a seventh aspect, alone or in combination with one or more of the first through sixth aspects, the one or more parameters include one or more of: locations of resources of the first channel or the second channel, a number of bits of the first communication, a number of bits of the second communication, an MCS of the first communication, an MCS of the second communication, or a content type of one or more of the first communication or the second communication.

In an eighth aspect, alone or in combination with one or more of the first through seventh aspects, the one or more parameters include one or more of: whether the first channel collides with a beginning of the second channel, whether the second channel collides with a beginning of the first channel, a configuration of a HARQ feedback codebook of one or more of the first channel or the second channel, a demodulation reference signal pattern configured for one or more of the first channel or the second channel, whether the first channel is scheduled with repetitions, whether the second channel is scheduled with repetitions, whether the first channel and the second channel are associated with a single TRP or multiple TRPs, or a channel type of one or more of the first channel or the second channel.

In a ninth aspect, alone or in combination with one or more of the first through eighth aspects, the one or more parameters include one or more of: whether transmission of the first scheduling grant occurs before transmission of the second scheduling grant, whether transmission of a higher priority grant, of the first scheduling grant and the second scheduling grant, occurs before receipt of a lower priority grant, of the first scheduling grant and the second scheduling grant, or whether transmission of a shared channel scheduling grant, of the first scheduling grant and the second scheduling grant, occurs before transmission of a control channel scheduling grant, of the first scheduling grant and the second scheduling grant.

In a tenth aspect, alone or in combination with one or more of the first through ninth aspects, the one or more parameters include one or more of: whether the mobile station supports maintaining phase continuity across simultaneous transmissions of the first communication and the second communication, whether the mobile station is power limited for simultaneous transmission, whether a maximum power reduction associated with simultaneous transmission satisfies a threshold, whether the mobile station supports simultaneous transmission of multiple communications, or whether the first channel and the second channel are scheduled or configured on inter-band component carriers or intra-band component carriers.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
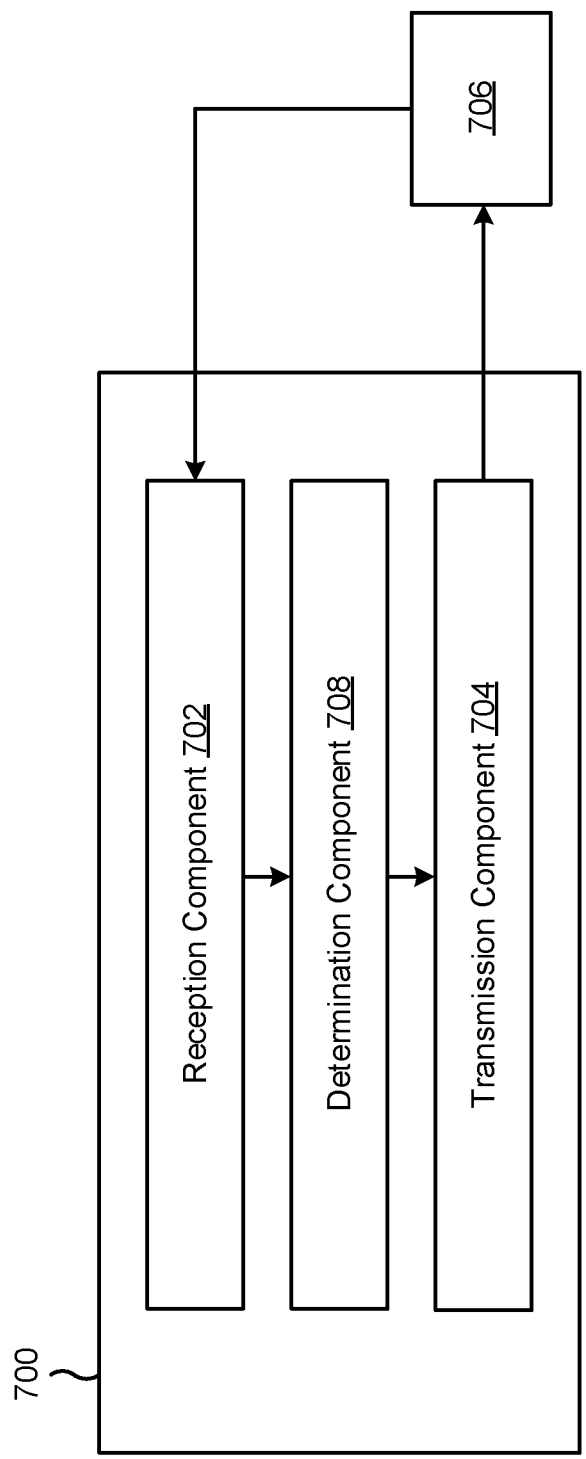
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a determination component 708.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The determination component 708 may determine whether to multiplex or prioritize a first communication and a second communication that are scheduled for simultaneous transmissions via a first channel and a second channel, respectively. In some aspects, the determination component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 704 may transmit one or more of the first communication or the second communication based at least in part on the determination of whether to multiplex or prioritize the first communication and the second communication.

The transmission component 704 may transmit an indication of a capability of the mobile station to support simultaneous transmission via multiple channels.

The reception component 702 may receive an indication of whether to multiplex or prioritize the first communication and the second communication, wherein the determination of whether to multiplex or prioritize the first communication and the second communication is based at least in part on the indication.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
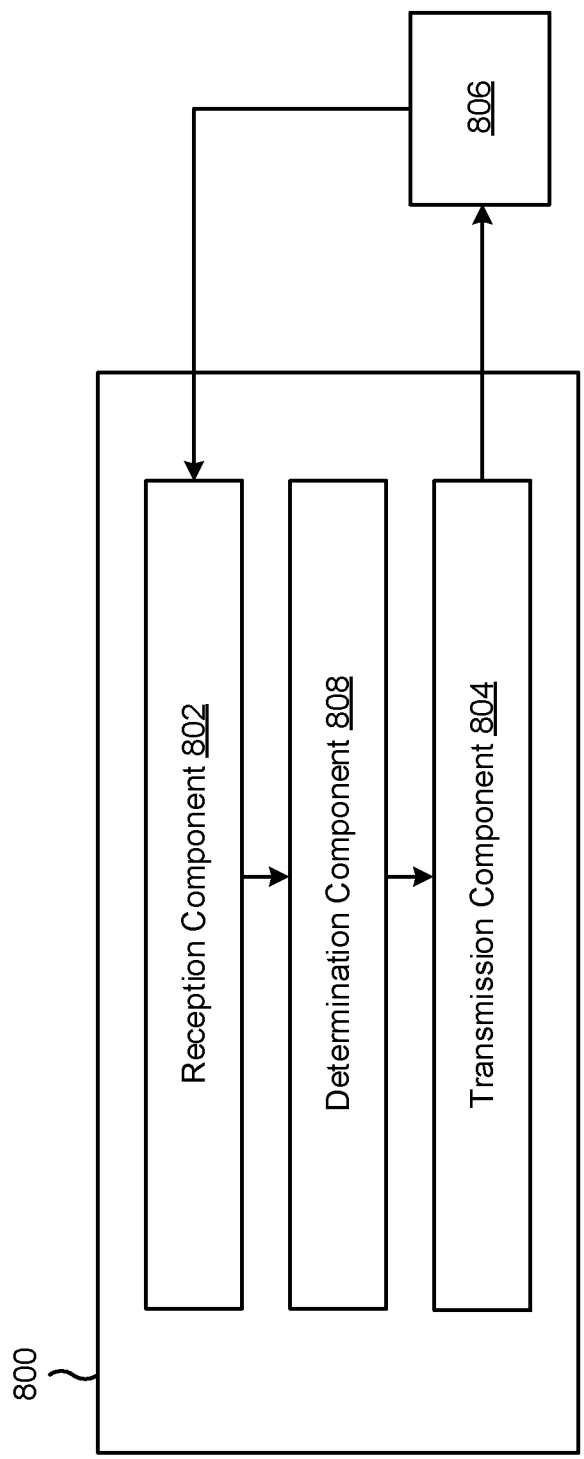

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be collocated with the reception component 802 in a transceiver.

The transmission component 804 may transmit, to a mobile station, a first scheduling grant associated with a first communication via a first channel and a second scheduling grant associated with a second communication via a second channel, the first communication and the second communication scheduled for simultaneous transmission. The reception component 802 may receive, by the base station and from the mobile station, one or more of the first communication or the second communication based at least in part on a determination of whether to multiplex or prioritize the first communication and the second communication.

The reception component 802 may receive an indication of a capability of the mobile station to support simultaneous transmission via multiple channels.

The transmission component 804 may transmit an indication of whether to multiplex or prioritize the first communication and the second communication, wherein the determination of whether to multiplex or prioritize the first communication and the second communication is based at least in part on the indication.

The determination component 808 may determine how to schedule the first communication and/or the second communication based at least in part on how the mobile station is to determine whether to multiplex or prioritize the first communication and the second communication. In some aspects, the determination component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a mobile station, comprising: determining, by the mobile station, whether to multiplex or prioritize a first communication and a second communication that are scheduled for simultaneous transmissions via a first channel and a second channel, respectively; and transmitting, by the mobile station, one or more of the first communication or the second communication based at least in part on the determination of whether to multiplex or prioritize the first communication and the second communication.

Aspect 2: The method of Aspect 1, wherein multiplexing the first communication and the second communication comprises one or more of: transmitting the first communication and the second communication on two or more of the first channel, the second channel, or a third channel simultaneously; or transmitting the first communication and the second communication on one of the first channel, the second channel, or the third channel.

Aspect 3: The method of any of Aspects 1-2, further comprising: transmitting an indication of a capability of the mobile station to support simultaneous transmission via multiple channels.

Aspect 4: The method of any of Aspects 1-3, further comprising: receiving an indication of whether to multiplex or prioritize the first communication and the second communication, wherein the determination of whether to multiplex or prioritize the first communication and the second communication is based at least in part on the indication.

Aspect 5: The method of Aspect 4, wherein the indication of whether to multiplex or prioritize the first communication and the second communication comprises: an indication of whether the first communication and the second communication can be multiplexed on the first channel, an indication of whether the first communication and the second communication can be multiplexed on the second channel, or an indication of whether the first communication and the second communication can be multiplexed on a third channel.

Aspect 6: The method of any of Aspects 4-5, wherein receiving the indication comprises: receiving the indication via one or more scheduling grants associated with one or more of the first communication or the second communication or receiving the indication via a radio resource control communication.

Aspect 7: The method of any of Aspects 1-6, wherein the determination of whether to multiplex or prioritize the first communication and the second communication is based at least in part on one or more parameters associated with one or more of the first communication, the second communication, the first channel, or the second channel.

Aspect 8: The method of Aspect 7, wherein the one or more parameters comprise one or more of: locations of resources of the first channel or the second channel, a number of bits of the first communication, a number of bits of the second communication, a modulation and coding scheme of the first communication, a modulation and coding scheme of the second communication, or a content type of one or more of the first communication or the second communication.

Aspect 9: The method of any of Aspects 7-8, wherein the one or more parameters comprise one or more of: whether the first channel collides with a beginning of the second channel, whether the second channel collides with a beginning of the first channel, a configuration of a hybrid automatic repeat request feedback codebook of one or more of the first channel or the second channel, a demodulation reference signal pattern configured for one or more of the first channel or the second channel, whether the first channel is scheduled with repetitions, whether the second channel is scheduled with repetitions, whether the first channel and the second channel are associated with a single transmit receive point (TRP) or multiple TRPs, or a channel type of one or more of the first channel or the second channel.

Aspect 10: The method of any of Aspects 7-9, wherein the one or more parameters comprise one or more of: whether receipt of a first scheduling grant associated with the first communication occurs before receipt of a second scheduling grant associated with the second communication, or whether receipt of a first scheduling grant associated with a higher priority communication of the first communication and the second communication occurs before receipt of a second scheduling grant associated with a lower priority communication of the first communication and the second communication, or whether receipt of a first scheduling grant associated with a shared channel communication of the first communication and the second communication occurs before receipt of a second scheduling grant associated with a control channel communication of the first communication and the second communication.

Aspect 11: The method of any of Aspects 7-10, wherein the one or more parameters comprise one or more of: whether the mobile station supports maintaining phase continuity across simultaneous transmissions of the first communication and the second communication, whether the mobile station is power limited for simultaneous transmission, whether a maximum power reduction associated with simultaneous transmission satisfies a threshold, whether the mobile station supports simultaneous transmission of multiple communications, or whether the first channel and the second channel are scheduled or configured on inter-band component carriers or intra-band component carriers.

Aspect 12: A method of wireless communication performed by a base station, comprising: transmitting, by the base station and to a mobile station, a first scheduling grant associated with a first communication via a first channel and a second scheduling grant associated with a second communication via a second channel, the first communication and the second communication scheduled for simultaneous transmission; and receiving, by the base station and from the mobile station, one or more of the first communication or the second communication based at least in part on a determination, by the mobile station, of whether to multiplex or prioritize the first communication and the second communication.

Aspect 13: The method of Aspect 12, wherein receiving the first communication and the second communication comprises one or more of: receiving the first communication and the second communication, via multiplexing, on two or more of the first channel, the second channel, or a third channel simultaneously; or receiving the first communication and the second communication, via multiplexing, on one of the first channel, the second channel, or the third channel.

Aspect 14: The method of any of Aspects 12-13, further comprising: receiving an indication of a capability of the mobile station to support simultaneous transmission via multiple channels.

Aspect 15: The method of any of Aspects 12-14, further comprising: transmitting an indication of whether to multiplex or prioritize the first communication and the second communication, wherein the determination of whether to multiplex or prioritize the first communication and the second communication is based at least in part on the indication.

Aspect 16: The method of Aspect 15, wherein the indication of whether to multiplex or prioritize the first communication and the second communication comprises: an indication of whether the first communication and the second communication can be multiplexed on the first channel, an indication of whether the first communication and the second communication can be multiplexed on the second channel, or an indication of whether the first communication and the second communication can be multiplexed on a third channel.

Aspect 17: The method of any of Aspects 15-16, wherein transmitting the indication comprises: transmitting the indication via one or more of the first scheduling grant or the second scheduling grant or receiving the indication via a radio resource control communication.

Aspect 18: The method of any of Aspects 12-17, wherein the determination of whether to multiplex or prioritize the first communication and the second communication is based at least in part on one or more parameters associated with one or more of the first communication, the second communication, the first channel, or the second channel.

Aspect 19: The method of Aspect 18, wherein the one or more parameters comprise one or more of: locations of resources of the first channel or the second channel, a number of bits of the first communication, a number of bits of the second communication, a modulation and coding scheme of the first communication, a modulation and coding scheme of the second communication, or a content type of one or more of the first communication or the second communication.

Aspect 20: The method of any of Aspects 18-19, wherein the one or more parameters comprise one or more of: whether the first channel collides with a beginning of the second channel, whether the second channel collides with a beginning of the first channel, a configuration of a hybrid automatic repeat request feedback codebook of one or more of the first channel or the second channel, a demodulation reference signal pattern configured for one or more of the first channel or the second channel, whether the first channel is scheduled with repetitions, whether the second channel is scheduled with repetitions, whether the first channel and the second channel are associated with a single transmit receive point (TRP) or multiple TRPs, or a channel type of one or more of the first channel or the second channel.

Aspect 21: The method of any of Aspects 18-20, wherein the one or more parameters comprise one or more of: whether transmission of the first scheduling grant occurs before transmission of the second scheduling grant, or whether transmission of a higher priority grant, of the first scheduling grant and the second scheduling grant, occurs before receipt of a lower priority grant, of the first scheduling grant and the second scheduling grant, or whether transmission of a shared channel scheduling grant, of the first scheduling grant and the second scheduling grant, occurs before transmission of a control channel scheduling grant, of the first scheduling grant and the second scheduling grant.

Aspect 22: The method of any of Aspects 18-22, wherein the one or more parameters comprise one or more of: whether the mobile station supports maintaining phase continuity across simultaneous transmissions of the first communication and the second communication, whether the mobile station is power limited for simultaneous transmission, whether a maximum power reduction associated with simultaneous transmission satisfies a threshold, whether the mobile station supports simultaneous transmission of multiple communications, or whether the first channel and the second channel are scheduled or configured on inter-band component carriers or intra-band component carriers.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a mobile station, comprising:
   one or more memories; and
   one or more processors, the one or more processors, individually or collectively and based at least in part on information stored in the one or more memories, being configured to:
   determine whether to multiplex or prioritize a first communication and a second communication that are scheduled for simultaneous transmissions via a first channel and a second channel, respectively, wherein the first channel comprises an uplink shared channel on a first carrier and the second channel comprises an uplink control channel on a second carrier; and
   transmit one or more of the first communication or the second communication based at least in part on the determination of whether to multiplex or prioritize the first communication and the second communication.

2. The apparatus of claim 1, wherein the one or more processors, to multiplex the first communication and the second communication, are configured to:
   transmit the first communication and the second communication on two or more of the first channel, the second channel, or a third channel simultaneously; or
   transmit the first communication and the second communication on one of the first channel, the second channel, or the third channel.

3. The apparatus of claim 1, wherein the one or more processors are further configured to:
   transmit an indication of a capability of the apparatus to support simultaneous transmission via multiple channels.

4. The apparatus of claim 1, wherein the one or more processors are further configured to:
   receive an indication of whether to multiplex or prioritize the first communication and the second communication,
   wherein the determination of whether to multiplex or prioritize the first communication and the second communication is based at least in part on the indication.

5. The apparatus of claim 4, wherein the indication of whether to multiplex or prioritize the first communication and the second communication comprises:
   an indication of whether the first communication and the second communication can be multiplexed on the first channel,
   an indication of whether the first communication and the second communication can be multiplexed on the second channel, or
   an indication of whether the first communication and the second communication can be multiplexed on a third channel.

6. The apparatus of claim 4, wherein the one or more processors, to receive the indication, are configured to:

receive the indication via one or more scheduling grants associated with one or more of the first communication or the second communication, or receive the indication via a radio resource control communication.

7. The apparatus of claim 1, wherein the determination of whether to multiplex or prioritize the first communication and the second communication is based at least in part on one or more parameters associated with one or more of the first communication, the second communication, the first channel, or the second channel.

8. The apparatus of claim 7, wherein the one or more parameters comprise one or more of:

locations of resources of the first channel or the second channel, a number of bits of the first communication, a number of bits of the second communication, a modulation and coding scheme of the first communication, a modulation and coding scheme of the second communication, or a content type of one or more of the first communication or the second communication.

9. The apparatus of claim 7, wherein the one or more parameters comprise one or more of:

whether the first channel collides with a beginning of the second channel, whether the second channel collides with a beginning of the first channel, a configuration of a hybrid automatic repeat request feedback codebook of one or more of the first channel or the second channel, a demodulation reference signal pattern configured for one or more of the first channel or the second channel, whether the first channel is scheduled with repetitions, whether the second channel is scheduled with repetitions, whether the first channel and the second channel are associated with a single transmit receive point (TRP) or multiple TRPs, or a channel type of one or more of the first channel or the second channel.

10. The apparatus of claim 7, wherein the one or more parameters comprise one or more of:

whether receipt of a first scheduling grant associated with the first communication occurs before receipt of a second scheduling grant associated with the second communication, whether receipt of a first scheduling grant associated with a higher priority communication of the first communication and the second communication occurs before receipt of a second scheduling grant associated with a lower priority communication of the first communication and the second communication, or whether receipt of a first scheduling grant associated with a shared channel communication of the first communication and the second communication occurs before receipt of a second scheduling grant associated with a control channel communication of the first communication and the second communication.

11. The apparatus of claim 7, wherein the one or more parameters comprise one or more of:

whether the apparatus supports maintaining phase continuity across simultaneous transmissions of the first communication and the second communication, whether the apparatus is power limited for simultaneous transmission, whether a maximum power reduction associated with simultaneous transmission satisfies a threshold, whether the apparatus supports simultaneous transmission of multiple communications, or whether the first channel and the second channel are scheduled or configured on inter-band component carriers or intra-band component carriers.

12. An apparatus for wireless communication at a network node, comprising:

one or more memories; and one or more processors, the one or more processors, individually or collectively and based at least in part on information stored in the one or more memories, being configured to:

transmit, to a mobile station, a first scheduling grant associated with a first communication via a first channel and a second scheduling grant associated with a second communication via a second channel, the first communication and the second communication scheduled for simultaneous transmission, wherein the first channel comprises an uplink shared channel on a first carrier and the second channel comprises an uplink control channel on a second carrier; and receive, from the mobile station, one or more of the first communication or the second communication based at least in part on a determination, by the mobile station, of whether to multiplex or prioritize the first communication and the second communication.

13. The apparatus of claim 12, wherein the one or more processors, to receive the first communication and the second communication, are configured to:

receive the first communication and the second communication, via multiplexing, on two or more of the first channel, the second channel, or a third channel simultaneously; or receive the first communication and the second communication, via multiplexing, on one of the first channel, the second channel, or the third channel.

14. The apparatus of claim 12, wherein the one or more processors are further configured to:

receive an indication of a capability of the mobile station to support simultaneous transmission via multiple channels.

15. The apparatus of claim 12, wherein the one or more processors are further configured to:

transmit an indication of whether to multiplex or prioritize the first communication and the second communication, wherein the determination of whether to multiplex or prioritize the first communication and the second communication is based at least in part on the indication.

16. The apparatus of claim 15, wherein the indication of whether to multiplex or prioritize the first communication and the second communication comprises:

an indication of whether the first communication and the second communication can be multiplexed on the first channel, an indication of whether the first communication and the second communication can be multiplexed on the second channel, or an indication of whether the first communication and the second communication can be multiplexed on a third channel.

17. The apparatus of claim 15, wherein the one or more processors, to transmit the indication, are configured to:

transmit the indication via one or more of the first scheduling grant or the second scheduling grant, or receive the indication via a radio resource control communication.

18. The apparatus of claim 12, wherein the determination of whether to multiplex or prioritize the first communication and the second communication is based at least in part on one or more parameters associated with one or more of the first communication, the second communication, the first channel, or the second channel.

19. The apparatus of claim 18, wherein the one or more parameters comprise one or more of:
locations of resources of the first channel or the second channel,
a number of bits of the first communication,
a number of bits of the second communication,
a modulation and coding scheme of the first communication,
a modulation and coding scheme of the second communication, or
a content type of one or more of the first communication or the second communication.

20. The apparatus of claim 18, wherein the one or more parameters comprise one or more of:
whether the first channel collides with a beginning of the second channel,
whether the second channel collides with a beginning of the first channel,
a configuration of a hybrid automatic repeat request feedback codebook of one or more of the first channel or the second channel,
a demodulation reference signal pattern configured for one or more of the first channel or the second channel,
whether the first channel is scheduled with repetitions,
whether the second channel is scheduled with repetitions,
whether the first channel and the second channel are associated with a single transmit receive point (TRP) or multiple TRPs, or
a channel type of one or more of the first channel or the second channel.

21. The apparatus of claim 18, wherein the one or more parameters comprise one or more of:
whether transmission of the first scheduling grant occurs before transmission of the second scheduling grant, or
whether transmission of a higher priority grant, of the first scheduling grant and the second scheduling grant, occurs before receipt of a lower priority grant, of the first scheduling grant and the second scheduling grant, or
whether transmission of a shared channel scheduling grant, of the first scheduling grant and the second scheduling grant, occurs before transmission of a control channel scheduling grant, of the first scheduling grant and the second scheduling grant.

22. The apparatus of claim 18, wherein the one or more parameters comprise one or more of:
whether the mobile station supports maintaining phase continuity across simultaneous transmissions of the first communication and the second communication,
whether the mobile station is power limited for simultaneous transmission,
whether a maximum power reduction associated with simultaneous transmission satisfies a threshold,
whether the mobile station supports simultaneous transmission of multiple communications, or
whether the first channel and the second channel are scheduled or configured on inter-band component carriers or intra-band component carriers.

23. A method of wireless communication performed by a mobile station, comprising:
determining, by the mobile station, whether to multiplex or prioritize a first communication and a second communication that are scheduled for simultaneous transmissions via a first channel and a second channel, respectively, wherein the first channel comprises an uplink shared channel on a first carrier and the second channel comprises an uplink control channel on a second carrier; and
transmitting, by the mobile station, one or more of the first communication or the second communication based at least in part on the determination of whether to multiplex or prioritize the first communication and the second communication.

24. The method of claim 23, wherein multiplexing the first communication and the second communication comprises one or more of:
transmitting the first communication and the second communication on two or more of the first channel, the second channel, or a third channel simultaneously; or
transmitting the first communication and the second communication on one of the first channel, the second channel, or the third channel.

25. The method of claim 23, further comprising:
receiving an indication of whether to multiplex or prioritize the first communication and the second communication,
wherein the determination of whether to multiplex or prioritize the first communication and the second communication is based at least in part on the indication.

26. The method of claim 23, wherein the determination of whether to multiplex or prioritize the first communication and the second communication is based at least in part on one or more parameters associated with one or more of the first communication, the second communication, the first channel, or the second channel.

27. A method of wireless communication performed by a base station, comprising:
transmitting, by the base station and to a mobile station, a first scheduling grant associated with a first communication via a first channel and a second scheduling grant associated with a second communication via a second channel, the first communication and the second communication scheduled for simultaneous transmission, wherein the first channel comprises an uplink shared channel on a first carrier and the second channel comprises an uplink control channel on a second carrier; and
receiving, by the base station and from the mobile station, one or more of the first communication or the second communication based at least in part on a determination, by the mobile station, of whether to multiplex or prioritize the first communication and the second communication.

28. The method of claim 27, wherein receiving the first communication and the second communication comprises one or more of:
receiving the first communication and the second communication, via multiplexing, on two or more of the first channel, the second channel, or a third channel simultaneously; or receiving the first communication and the second communication, via multiplexing, on one of the first channel, the second channel, or the third channel.

29. The method of claim 27, further comprising:

transmitting an indication of whether to multiplex or prioritize the first communication and the second communication,
  wherein the determination of whether to multiplex or prioritize the first communication and the second communication is based at least in part on the indication.

30. The method of claim 27, wherein the determination of whether to multiplex or prioritize the first communication and the second communication is based at least in part on one or more parameters associated with one or more of the first communication, the second communication, the first channel, or the second channel.

\* \* \* \* \*